Figure 13:
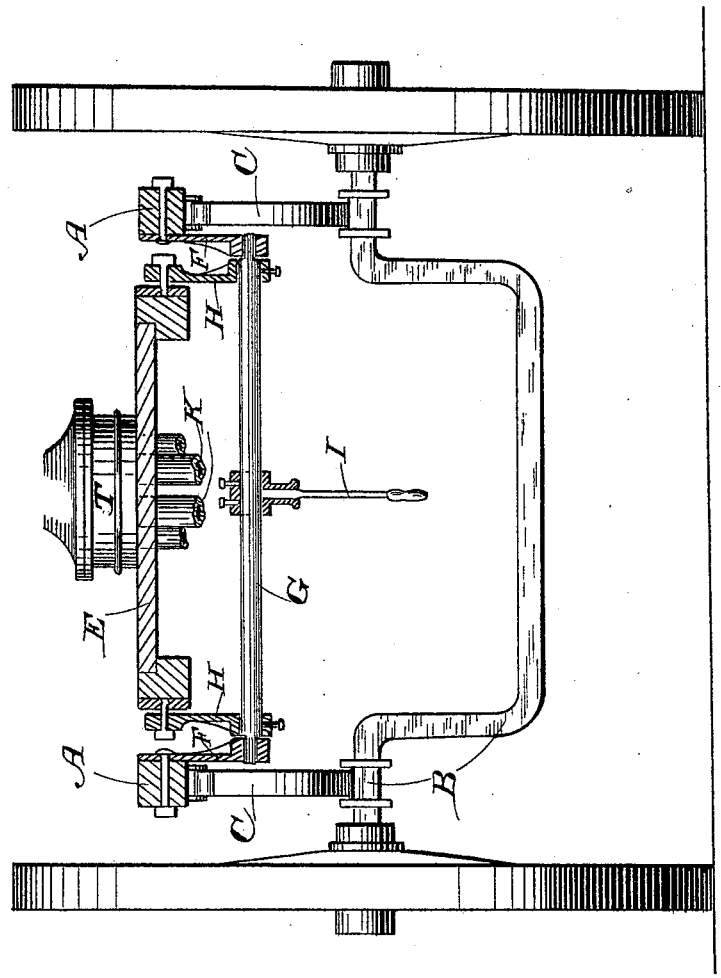

No. 613,368. Patented Nov. 1, 1898.
H. H. GORTER.
PORTABLE WATER BATTERY.
(Application filed Mar. 23, 1897.)
(No Model.) 6 Sheets—Sheet 1.
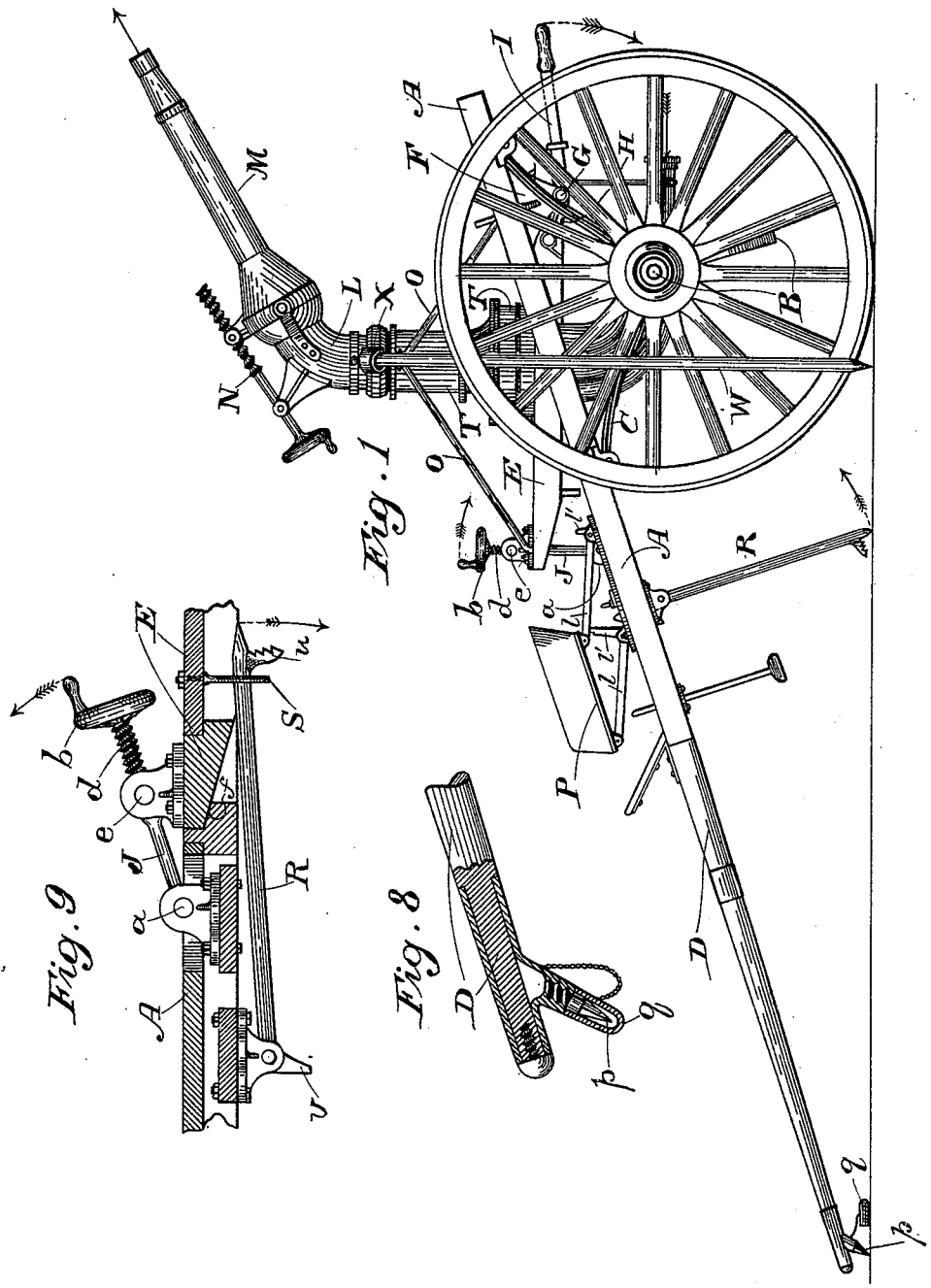
WITNESSES
J. A. Bayless
J. R. Booy
INVENTOR
Henry H. Gorter
by Jno. C. Boone
his attorney No. 613,368. Patented Nov. 1, 1898.
H. H. GORTER.
PORTABLE WATER BATTERY.
(Application filed Mar. 23, 1897.)
(No Model.) 6 Sheets—Sheet 2.
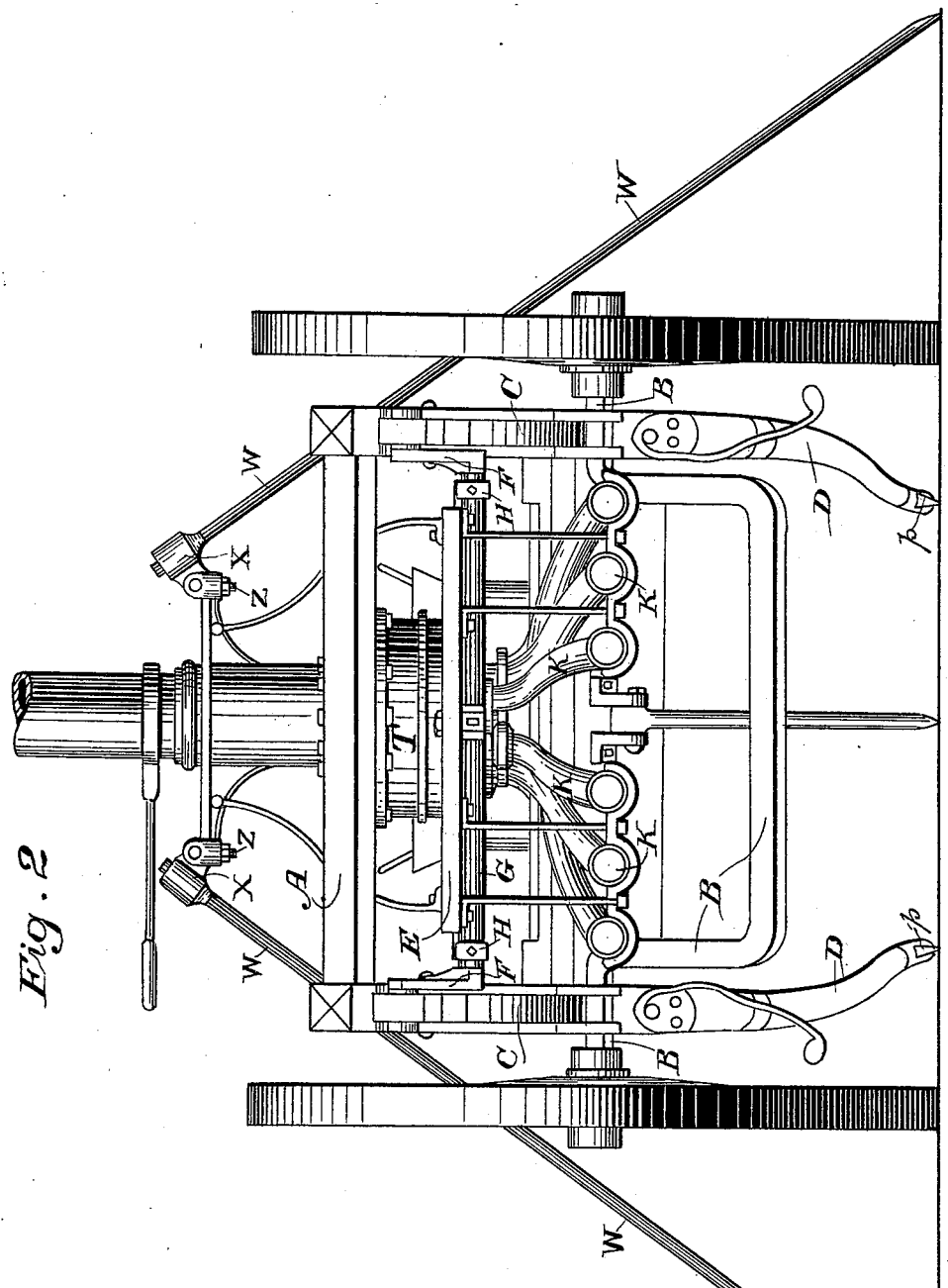

No. 613,368. Patented Nov. 1, 1898.
H. H. GORTER.
PORTABLE WATER BATTERY.
(Application filed Mar. 23, 1897.)
(No Model.) 6 Sheets—Sheet 3.
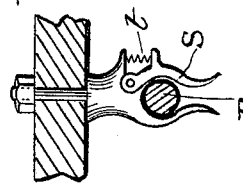
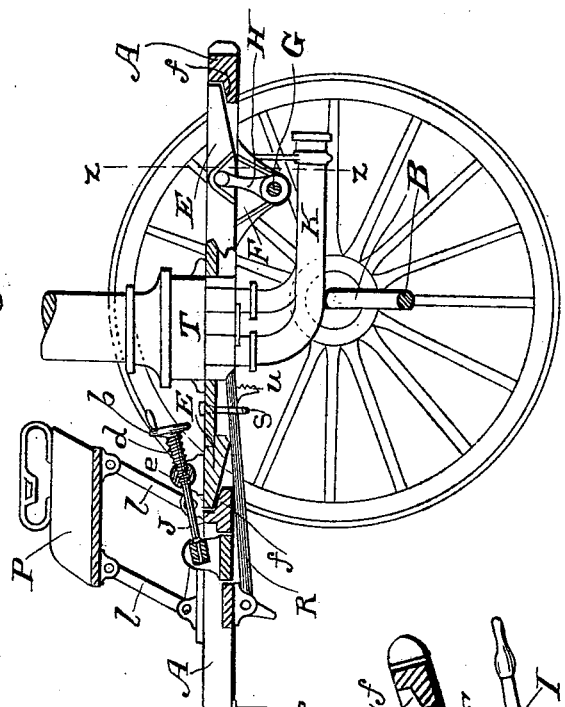
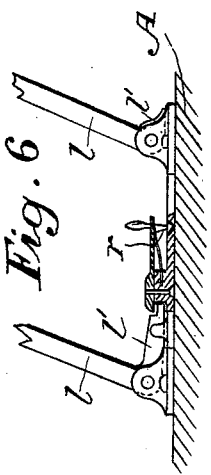
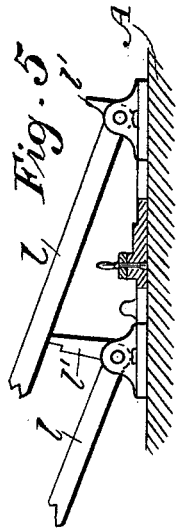
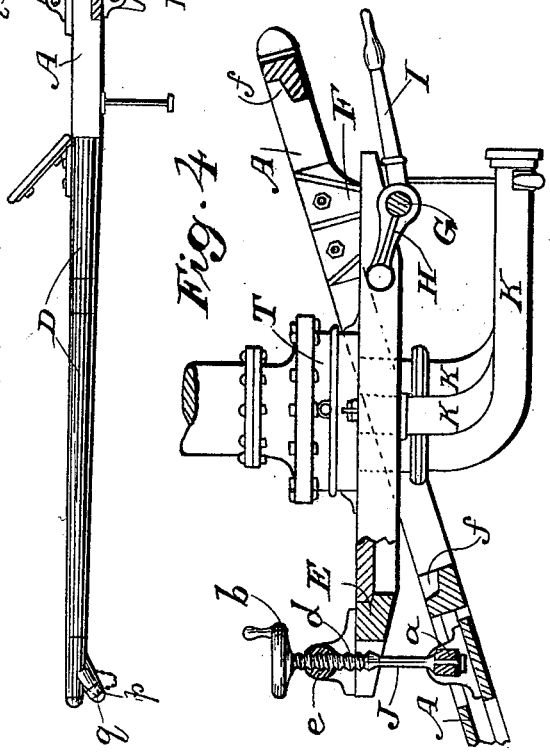
WITNESSES
J. A. Bayless
W. Boone
INVENTOR
Henry H. Gorter
by Jno. L. Boone
his Attorney
THE NORRIS PETERS CO., PHOTO-LITHO., WASHINGTON, D. C.

No. 613,368. Patented Nov. 1, 1898.
H. H. GORTER.
PORTABLE WATER BATTERY.
(Application filed Mar. 23, 1897.)
(No Model.) 6 Sheets—Sheet 4.
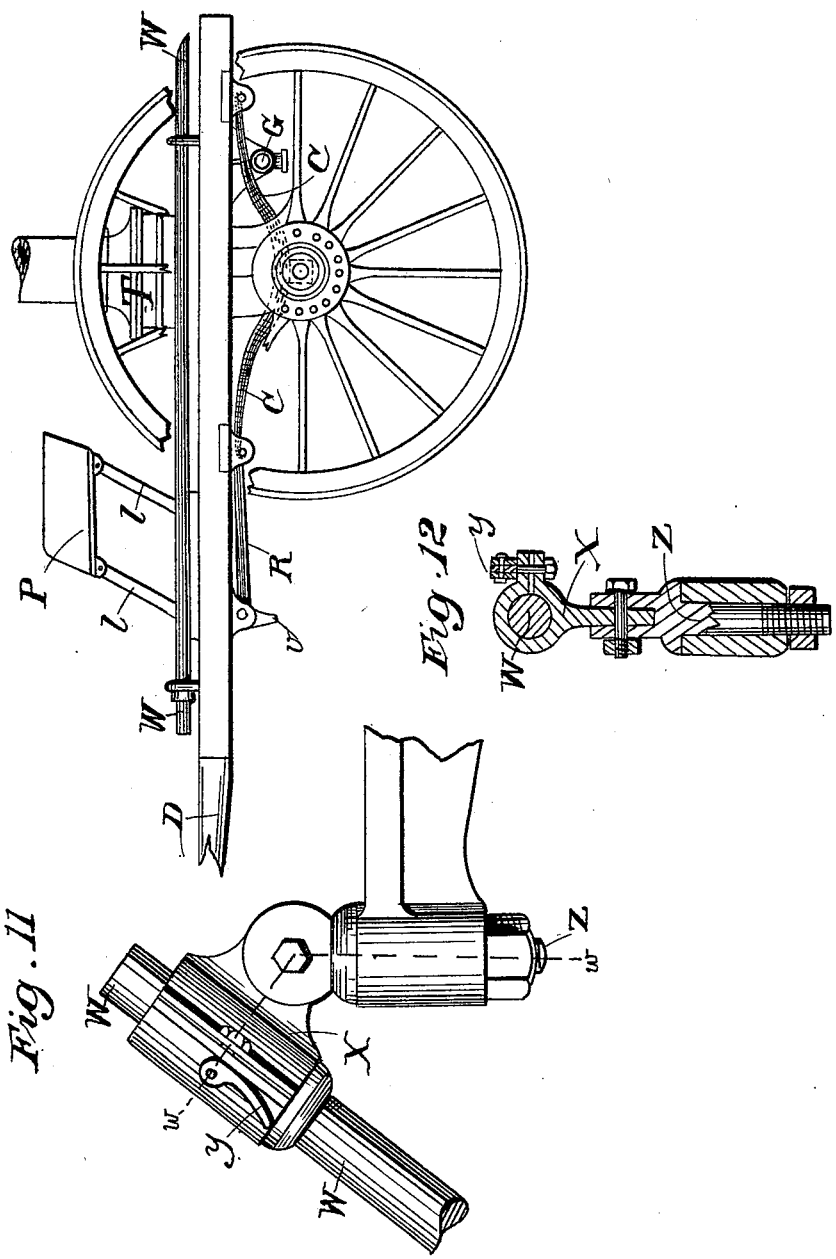
WITNESSES
INVENTOR
Henry H Gorter
by Jno. L. Boone
his attorney No. 613,368. Patented Nov. 1, 1898.
H. H. GORTER.
PORTABLE WATER BATTERY.
(Application filed Mar. 23, 1897.)

(No Model.) 6 Sheets—Sheet 5.

WITNESSES
J. A. Bayless
J. R. Boone

INVENTOR
Henry H. Gorter
by Jno. L. Boone
his Attorney

No. 613,368. Patented Nov. 1, 1898.
H. H. GORTER.
PORTABLE WATER BATTERY.
(Application filed Mar. 23, 1897.)
(No Model.) 6 Sheets—Sheet 6.
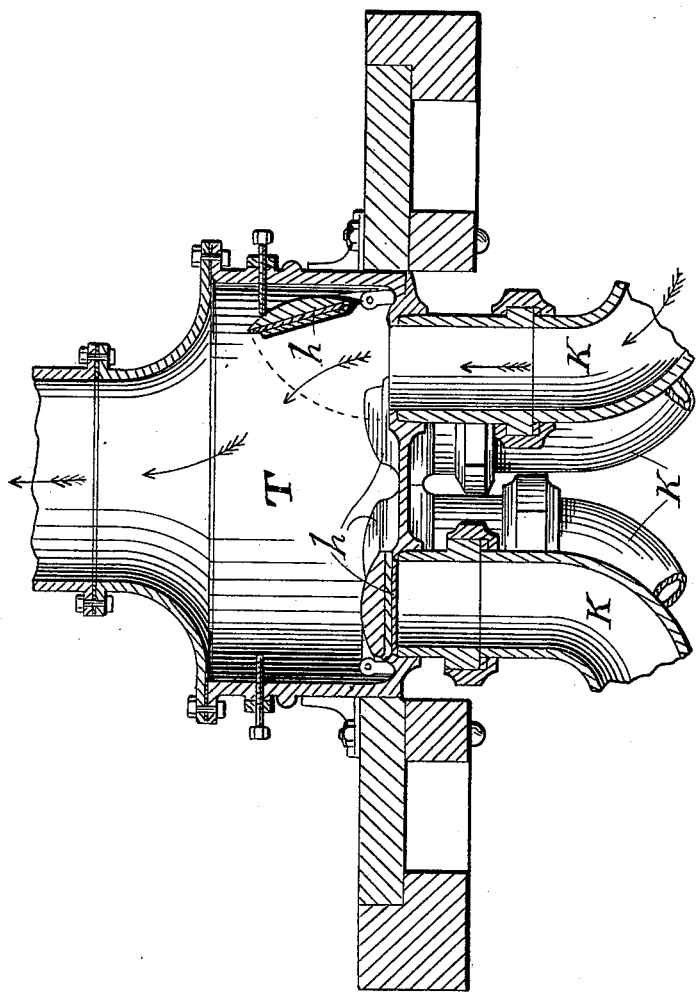
WITNESSES
J. A. Bayless
INVENTOR
Henry H. Gorter
by Jno. L. Boone
his Attorney

UNITED STATES PATENT OFFICE.

HENRY H. GORTER, OF SAN FRANCISCO, CALIFORNIA, ASSIGNOR TO MARY E. GORTER, OF SAME PLACE.

PORTABLE WATER-BATTERY.

SPECIFICATION forming part of Letters Patent No. 613,368, dated November 1, 1898.

Application filed March 23, 1897. Serial No. 628,862. (No model.)

*To all whom it may concern:*

Be it known that I, HENRY H. GORTER, a citizen of the United States, residing at San Francisco, in the county of San Francisco and State of California, have invented certain new and useful Improvements in Portable Water-Batteries; and I do hereby declare the following to be a full, clear, and exact description of said invention, such as will enable others skilled in the art to which it most nearly appertains to make, use, and practice the same.

My invention has reference to fire-extinguishing apparatus, and relates to a portable machine and apparatus for siamesing or uniting and concentrating the streams from two or more fire-engines into a single pipe and forcing it from a single nozzle in order to secure greater effectiveness in extinguishing fires, the whole constituting what I call a "portable water-battery."

My improved water-battery is mounted on two wheels like a cart, so that it can be readily moved from place to place and quickly anchored and set for work, and it is provided with suitable devices for rendering it stable and firm to resist the force and pressure of the water and to accommodate it to the various positions it may assume when being moved from place to place or when set in position for action, all as hereinafter more fully described.

Referring to the accompanying drawings, Figure 1 is a side view of the fire-extinguishing apparatus, showing it in working position anchored to the ground. Fig. 2 is an end view of the apparatus in the same position. Fig. 3 is a longitudinal section of the apparatus in a raised horizontal position ready to be drawn to a fire. Fig. 4 is an enlarged sectional detail showing it in its working position. Fig. 5 is a detail of the hinged seat-standards thrown forward. Fig. 6 shows the same thrown up and locked in position. Fig. 7 is a detail of spring-catch for holding the brace R. Fig. 8 is a detail of front end of one of the shafts with its pointed toe and shield. Fig. 9 is a sectional detail of the screw-rod connection of the movable platform and the stationary part of the apparatus. Fig. 10 shows the manner of carrying the anchoring-rods when not in use. Fig. 11 is a detail of the hinged connection for securing the upper ends of the anchoring-rods when used for bracing the apparatus. Fig. 12 is a section on the line $w\,w$ of Fig. 11. Fig. 13 is a transverse section of the rear of the apparatus on the line $z\,z$ of Fig. 3. Fig. 14 is an enlarged vertical section of the water-chamber pipes and valves.

Let A represent a strong frame or platform which is mounted upon the axle B of a two-wheeled vehicle. This platform is supported at a convenient distance above the axle by means of side springs or braces C C, the lower ends of which are firmly secured on the axle inside the wheels. Attached to and projecting from the forward end of the platform A is a pair of shafts D D for a single horse, or a pole for two horses could be used for draft purposes.

An opening is made in the frame or platform A above the axle of sufficient size to accommodate a secondary or supplemental platform E, and this platform is large enough to serve as the foundation and support of the siamesing-chamber, supply-pipes, and discharge-pipe. A short distance in front of this opening, in which the supplemental platform E is mounted, I secure to the main platform A one end of a rod or standard J by means of a hinge-joint $a$, which is so constructed that the standard can fall toward the opening. This rod has its lower end journaled in the hinge, so that it can be turned by means of a hand-wheel $b$ at its opposite or upper end. A screw-thread $d$ is cut on the upper end of the rod, and another hinge $e$ has a side extension through which a corresponding hole, tapped with a corresponding screw-thread, passes, so that the hinge $e$ can be raised or lowered along the rod by turning the hand-wheel $b$ in whatever position the rod may assume.

The front end of platform E is connected with the adjustable hinge $e$, so that the rod and its two hinges constitute a link whose length can be adjusted or varied by means of the hand-wheel and screw-rod. This rod and its hinges therefore connect the front end of the supplemental platform with the main platform or frame and permits them to assume different relations and planes. In other words, it permits the platform E to be adjusted to a horizontal position even when the main frame stands at an inclined plane, which it will do when the shafts are dropped to the ground, and at the same time and by the same movement it permits the platform E to move forward, and thus accomplish a further purpose that will be hereinafter explained.

The rear end of platform E is suspended in the opening by the following-described mechanism:

A depending bracket or hanger F is secured to the main frame on each side of the opening, near its rear end, and the lower ends of these hangers form bearings for the ends of a rock-shaft G, Fig. 2, which extends across below the rear end of the platform. A fixed lever-arm H extends vertically from this rock-shaft up to and is connected with the platform E, near each side. A hand-lever I extends rearward from the rock-shaft at some convenient point, so that by moving it up or down the rock-shaft is partially rotated. A forward rotation of the rock-shaft causes the throw of the lever-arms H to move the platform forward a corresponding distance, the link action of the rod and hinges at the forward end acting in conjunction with the rock-shaft and lever at the rear end.

The front and rear edges of the opening in the main frame are rabbeted, as shown at $f$, Fig. 4, and the under side of the platform at each end is chamfered or beveled, so that the front and rear edges of the platform rest upon and fit in the rabbets when the main platform is brought to a horizontal position and the supplemental platform is thrown back and adjusted to the opening.

As before stated, the siamesing-chamber, supply-pipes, and discharge-pipe are mounted upon the platform E, and they are so placed and located that when the shafts are raised to bring the main frame or platform A to a horizontal position and the secondary platform E is thrown back so as to fit and rest in the opening, as shown in Figs. 3 and 10, the weight or center of gravity of the parts is directly over the axle; but when the pole or shafts are dropped, as in Fig. 1, and the secondary platform E is thrown forward by means of the rock-shaft and link-standard the weight of these parts is thrown forward of the axle, so as to be sustained between the axle and resting-point of the pole or shafts, thus giving stability to the battery when it is in action.

The siamesing-chamber T is a strong casting made in two parts and bolted firmly to the platform E. It fits in and passes through an opening in the platform, and it has two or more supply-pipes K, connected with its bottom and bending rearward, as shown at Figs. 1, 2, 3, and 4. These supply-pipes have each a coupling connection at their rear ends, so that the hose of a fire-engine can be connected with either of them. An upward-lifting valve $h$ closes the upper end of each supply-pipe inside the chamber, so that water will pass freely into the chamber from either pipe and will be prevented from passing out through the others in case less than the whole number is in use.

The discharge-pipe connects with the upper part of the chamber K, and consists of an elbow L and nozzle M, the two latter being connected by a ball-and-socket joint.

N is a regulating hand-screw for directing and adjusting the nozzle.

The siamesing-chamber is strongly braced by guy-rods O to the platform E, so as to resist the strain and pressure caused by the reactionary force of the water on the apparatus.

The driver's seat P is mounted on the main frame or platform of the cart just in front of the opening in which platform E rests. This seat, if stationary, would interfere with and be in the way of the platform E and its adjusting apparatus. Consequently I mount it on hinged legs or supports $l\,l$, so that it can be thrown forward into the position shown at Fig. 1, where it will be out of the way when the apparatus is being used at a fire or when it is laid up in the engine-house. The forward legs $l$ of the seat have each a rectangular arm $l'$ extending rearward from their lower ends, so as to rest and bear upon the floor of the main frame when the seat is thrown up for use, thus forming a kind of foot that holds the seat in place. These same feet serve also as props or braces to sustain the seat in a partially-raised position when it is thrown forward, because the rear legs will strike against and rest upon the upturned ends of the feet, as shown at Figs. 1 and 5, and thus support the seat at an angle leaning forward. When the seat is thrown up in position for use, the feet lie flat upon the platform and serve as a brace and are latched in position by a rotary spring-latch $r$. (Shown plainly at Fig. 6.)

The battery is moved from place to place usually by a single horse. When it is hitched up, the shafts and main frame or platform are in a horizontal plane, the platform E is adjusted and fitted in its opening, so that the weight of the hydraulic apparatus is borne directly over the axle, and the seat is raised. When the battery has arrived at the place of use, the horse is unhitched and the shafts are allowed to drop to the ground; but before or simultaneously at the time of dropping them the seat is thrown forward and the platform E is freed from the rabbets in the opening. A man at lever I then moves the platform forward, so that the hinged rod at the front end is raised and caused to swing and suspend the front end of platform E and maintain it on a level when the shafts are dropped.

A sharp forward-projecting toe $p$ is formed on or secured to the under side of each shaft at its forward end, and it inclines forward, so that as soon as the shafts are dropped their toe will rest upon and penetrate the ground at the slightest forward pressure on the vehicle and will thus cause the shafts to form a brace that will resist forward pressure. A thimble or shield $q$ is adapted to fit over and protect this toe when it is not in use. Another brace (marked R) has its forward end hinged to the under side of the main platform below the seat. This brace extends backward underneath the platform E, and its opposite or free end is clasped when the brace is thrown up against the under side of the platform by a spring-clamp S on the underside of platform A, as shown plainly at Fig. 7. This clamp consists of two downward-projecting arms, one of which is rigid and the other is hinged and held in position by a spring $t$, so that the brace is held up between the two arms by the friction resulting from the pressure of the spring-arm. When the shafts are dropped down and the platform E is moved forward and upward by the action of the rock-shaft and its arm, the free end of the brace is released and freed automatically from the clamp and its released end swings down to the bracing position shown in Fig. 1. The lower end of this brace is pointed, and it has a toothed heel-piece $u$ projecting from it, so that when it is in its bracing position during the working of the battery it penetrates and engages with the ground and serves as a brace to sustain the middle of the cart and resist back pressure upon it. The upper end of the brace has a shoulder $v$ at its top and back of the hinge, which gives a bearing and bracing surface against the under side of the cart-frame.

For further security against side strains and pressure upon the cart I use, when necessary, long side braces W W, one on each side of the water-chamber. These braces are secured at the upper ends in a hinged swivel-collar X, on each side of the water-chamber, and they extend outward to a distance on each side and, if necessary, passing them between the spokes of the wheel, as represented at Fig. 2. Their pointed lower ends penetrate the ground and brace the machine against side strains. The collars X are hinged to a swivel-rod $z$, which is secured in a framework surrounding the water-chamber, so that they can adjust themselves to the proper angle, and the upper end of the brace-rod slips into and is fastened in the collar. A cam or clamp on the collar is operated by a lever $y$ on the outside to bind or clamp the rod in the collar at the point to which it adjusts itself in setting the brace.

When the machine is thus set and braced, the platform E can be leveled by means of the hand-wheel $b$, after which the hose-pipes from the engines can be coupled to the ends of the supply-pipes K and the streams delivered into the chamber and from thence be directed upon the fire through the discharge-pipe L and nozzle M.

I thus provide a simple easily and quickly handled water-battery that will do effective work in extinguishing fires.

Having thus described my invention, what I claim, and desire to secure by Letters Patent, is—

1. In a portable fire-extinguishing apparatus, the combination of a vehicle-frame, a platform, and front and rear links by which the platform is movably mounted on the frame, whereby the platform can be moved from a rearward position of inaction to a forward position for operation, the front links extending upward in a more rearward direction than the rear links in the position of inaction, whereby, when the platform is moved forward, the front portion will be raised relatively to the rear portion, and the platform tilted on the frame, substantially as described.

2. In a portable fire-extinguishing apparatus, the combination of a vehicle-frame, a platform, and front and rear links by which the platform is movably mounted on the frame, whereby the platform can be moved from a rearward position of inaction to a forward position for operation, said links being so disposed that the rear portion of the platform swings downward while the front portion swings upward when the platform moves forward, so that the platform is tilted on the frame, substantially as described.

3. In a portable fire-extinguishing apparatus, the combination of a vehicle-frame, a platform, and front and rear links by which the platform is movably mounted on the frame, whereby the platform can be moved from a rearward position of inaction to a forward position for operation, said links being so disposed that the rear portion of the platform swings downward while the front portion swings upward when the platform moves forward, so that the platform is tilted on the frame, and the links at one end being adjustable in length, substantially as described.

4. In a portable fire-extinguishing apparatus, the combination of a vehicle-frame, hangers depending from the frame, a platform, and front and rear links by which the platform is movably mounted on the frame, whereby the platform can be moved from a rearward position of inaction to a forward position for operation, the rear links being pivoted on the hangers below the frame and said links being so disposed that the rear portion of the platform swings downward while the front portion swings upward when the platform moves forward, so that the platform is tilted on the frame, substantially as described.

5. In a portable fire-extinguishing apparatus, the combination of a vehicle-frame, a seat, front and rear hinged legs for movably supporting the seat, said legs at the front or rear having an angular extension to serve as a prop when the seat is shifted, and a locking device fixedly secured to the frame, and engaging said extension to hold the seat rigidly in position, before the seat is shifted, substantially as described.

6. In a portable fire-extinguishing apparatus, the combination of a vehicle-frame, having a recess with rabbeted front and rear edges, a fire-extinguishing device normally resting upon said rabbeted edges, and links pivoted to said frame and connected to the front and rear ends of said device, the rear link swinging from a substantially vertical position to a horizontal position and the front link swinging from a substantially horizontal position to a vertical position when the device is moved out of its position of support on said edges, substantially as described.

7. In a portable fire-extinguishing apparatus, the combination of a vehicle-frame, having a central recess with rabbeted front and rear edges, fixed hangers depending from the sides of the recess at the rear portion thereof, a rock-shaft having bearings on said hangers, arms secured to said rock-shaft, a platform on the rear of which said arms are pivoted and adapted to rest upon said rabbeted edges, links connecting the front end of the platform with the frame adjacent thereto, and a hand-lever connected to said rock-shaft to rock the same, substantially as described.

8. In a portable fire-extinguishing apparatus, the combination of a vehicle-frame, having a central recess, fixed hangers depending from the sides of the recess at the rear portion thereof, a rock-shaft having bearings in said hangers, arms secured to said rock-shaft, a platform linked at its front end with frame, and pivoted within the free ends of said arms and adapted to rest on said rock-shaft, when lowered, substantially as described.

9. In a portable fire-extinguishing apparatus consisting of a siamesing-chamber, supply-pipes, discharge-pipe and nozzle mounted on an independent platform above the axle of a two-wheeled vehicle, a hinged adjustable leveling device connecting the front of the platform with the main frame or platform of the vehicle, and a rock-bar with lever and rigid connections for supporting the rear end of the platform, substantially as described.

10. In a portable fire-extinguishing apparatus a two-wheeled vehicle or cart having a pole or shafts adapted to serve as braces, a supplemental platform mounted in an opening in the main frame or platform of the cart; a fire-extinguishing apparatus mounted on the supplemental platform; adjusting and leveling devices connecting the supplemental platform with the main frame or platform of the cart, and side braces adapted to resist side strains and pressures on the vehicle, substantially as described.

11. A two-wheeled vehicle; a fire-extinguishing apparatus mounted on a supplemental platform above the axle; means connected with the vehicle for shifting the weight of the apparatus bodily in a longitudinal direction so as to carry its center of gravity in front of the axle; an automatic brace hinged to the frame or bottom of the cart and a friction-clamp on the adjustable platform for holding the free end of the brace whereby the brace is automatically released when the platform is shifted in a forward direction, substantially as described.

12. In a portable water-battery, the combination of a two-wheeled-vehicle frame, shafts rigidly extending forward therefrom, spurs at the ends of the shafts, a siamesing-chamber and a nozzle therefor adapted to be rearwardly directed, a support for said siamesing-chamber, mounted on said frame, and means for shifting said support forward and simultaneously lowering it, substantially as described.

13. In a portable water-battery, the combination of a two-wheeled-vehicle frame, shafts rigidly extending forward therefrom, fixed spurs extending downward from the end of said shafts and entering the ground in an oblique forward direction, a siamesing apparatus provided with a nozzle adapted to be rearwardly directed, and means for shifting said apparatus forward, to throw its weight on the spurs to force them obliquely into the ground to oppose a forward movement of the vehicle due to back pressure from the nozzle of the siamesing apparatus, substantially as described.

In testimony whereof I have hereunto set my hand this 13th day of March, 1897.

HENRY H. GORTER.

Witnesses:
CHARLES J. ARMBRUSTER,
W. R. BOONE.